Figure 4:
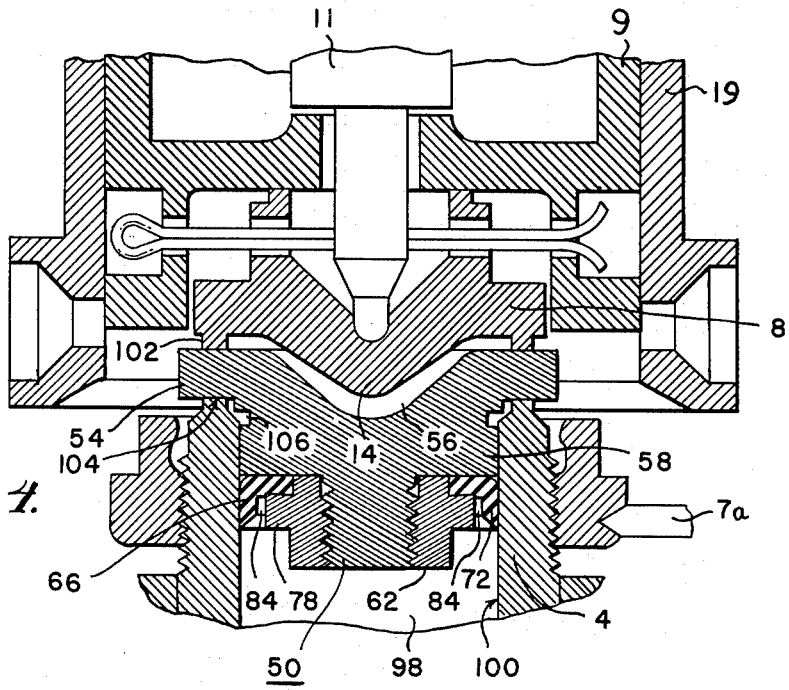

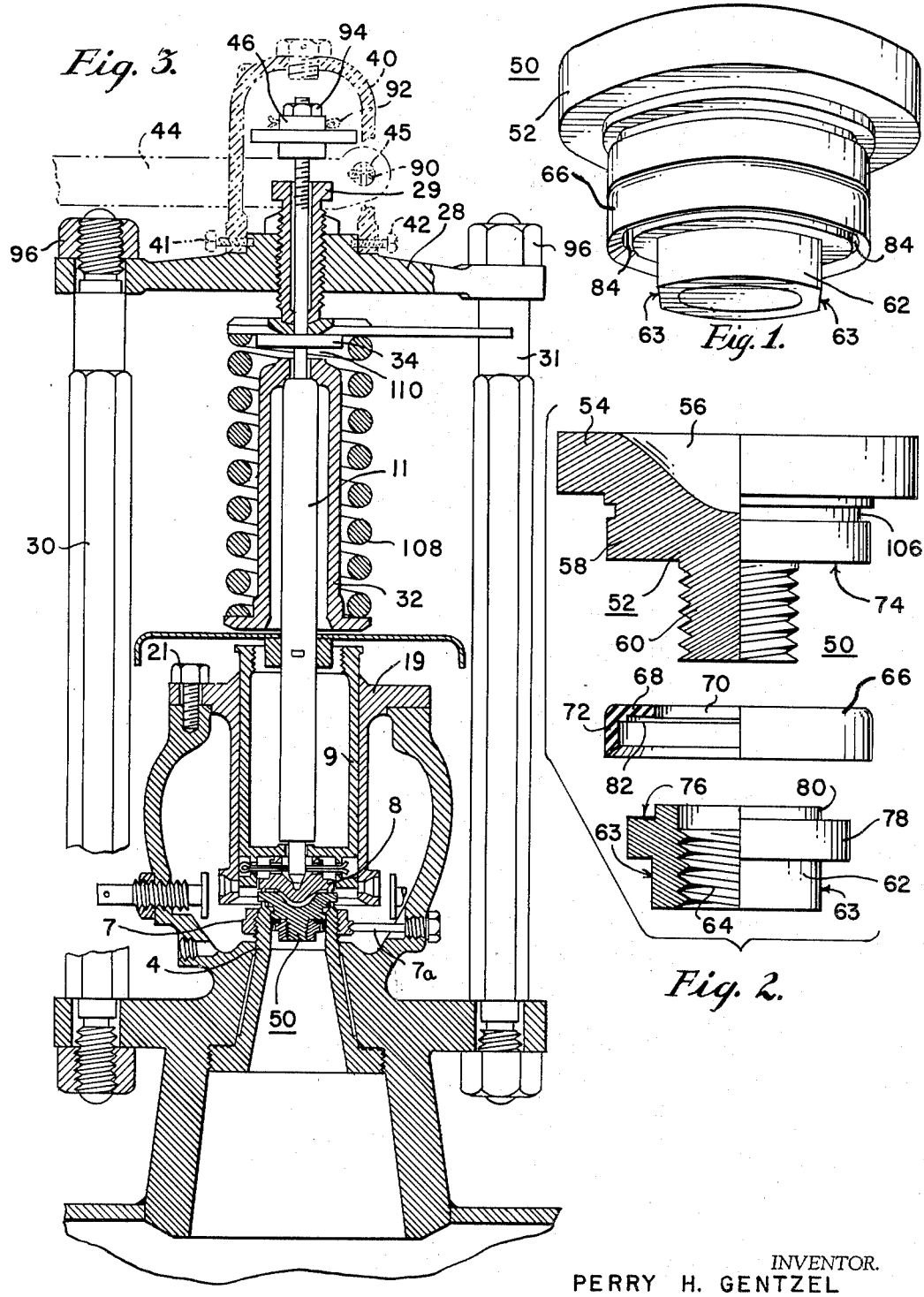

2,752,940
Patented July 3, 1956

2,752,940

VALVE SEALING DEVICE

Perry Homer Gentzel, State College, Pa.

Application July 3, 1952, Serial No. 297,050

2 Claims. (Cl. 137—469)

This invention relates to valve sealing devices and more particularly to sealing devices for valves of the pressure relief type.

My invention will be illustrated as applied in the valve shown in Figure 1 of my U. S. Patent No. 2,278,437 issued on April 7, 1942.

From time to time it is desirable to prevent a pressure relief valve from acting in its normal manner to limit the maximum fluid pressure within the container with which it is associated. Heretofore pressure relief valves of the type having a throat tube provided with a valve seat and a normally seated pressure loaded valve disk for restricting the relief opening in said throat tube, have been "gagged" by preventing the valve disk from being lifted off its seat by the fluid pressure in the relief opening under the valve disk. A threaded gag member was used to apply compressive force to the top of the valve spindle which has its lower end associated with the valve disk, in order to prevent the rod from lifting and to keep the valve disk seated.

This method of gagging has the disadvantage of applying a high compressive force between the ends of the spindle when the fluid pressure under the valve disk is increased, tending to bend and to otherwise damage the spindle disk and seats. Furthermore the slightest compression of the valve spindle under the force of the increased fluid pressure under the valve disk would unseat it and cause leakage.

A further disadvantage in the old method of gagging is that the valve disk and seat are relied upon to effect the sealing of the valve. Thus the valve disk and seat which are designed to operate under certain normal conditions are required to effect a fluid seal under more adverse conditions. In the case of the valve which has a disk that does not seal properly, it is necessary to repair this valve before it may be gagged in this manner.

When a hydrostatic test is performed using the old gagging method, it is usually necessary to relap the valve seats. This is because the valve seats are easily damaged by impurities such as the iron oxides which are allowed to reach the seats during the tests.

Accordingly an object of this invention is to provide a new and improved valve sealing device.

Another object of the invention is to provide a new and improved sealing device which obviates seating of the valve disk for the purpose of gagging the valve.

A further object of the invention is to provide a new and improved sealing device which prevents fluid under pressure from reaching the valve seat and protects the valve seat and disk.

Yet another object of the invention is to provide a new and improved valve sealing device which minimizes the possibility of damage to the valve.

Still another object of the invention is to provide a new and improved valve sealing device which operates efficiently when subjected to low or high fluid pressures.

A further object of this invention is to provide a new and improved valve sealing device which effectively maintains its seal even though increased fluid pressures result in the upward movement of the valve disk.

Yet a further object of this invention is to provide a new and improved valve sealing device which may readily be applied and removed from a valve.

Still a further object of this invention is to provide a new and improved valve sealing device which is simple in operation, easily manufactured and inexpensive in cost.

Figure 5:
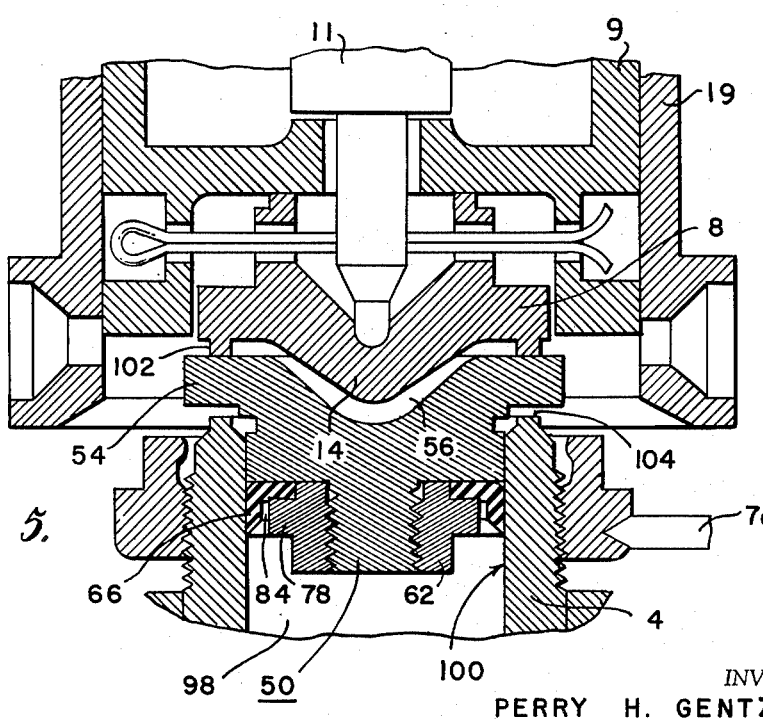

The above objects of the invention as well as many other objects will become apparent when the following description of the invention is read together with the drawings in which:

Figure 1 is a perspective view of a valve sealing device embodying the invention, Figure 2 is a side elevational exploded view partly in section of the device shown in Figure 1, Figure 3 is a side elevational view partly broken away, illustrative of a safety valve to which the device shown in Figure 1 has been applied, Figure 4 is an enlarged view showing the portion of Figure 3 including the valve sealing device, and Figure 5 is a view similar to that of Figure 4, illustrating the displacement of the valve sealing device and valve disk under conditions of high fluid pressure.

Like reference numerals designate like parts throughout the several views.

The Figures 1 and 2 show the valve sealing device 50 which comprises a plug 52 having a top or head portion 54. The head portion 54 is substantially a right cylindrical section provided with a central depression 56 in the top thereof.

The central or intermediate portion 58 of the plug 52 is substantially a right cylindrical section coaxial with the top portion 54 and of correspondingly reduced diameter.

The lower or stem portion 60 of plug 52 is threaded and coaxial with the top and intermediate portions 54 and 58.

A retaining nut 62 is provided with a threaded opening 64 for engaging the lower portion 60 of the plug 52, and flattened portions 63 to allow use of a wrench for tightening the nut 62 on the stem portion 60 of the plug 50.

A sealing ring 66, which may be formed of a composition synthetic fibre, has a central portion 68 which is provided with a centrally disposed opening 70 and a peripheral portion 72 disposed at substantially a right angle to the central portion 68.

The plug 52 retains the sealing ring 66 by receiving its central portion 68 between the lower surface 74 of the central portion 58 and the upper surface 76 of a flange 78 on the nut 62. It is noted that the projection 80 of the nut 64 is received through the central opening 70 of the ring 66 while the flange 78 of the nut 62 is received in an annular depression 82 in the lower surface of the central portion 68 of the ring 66.

It is further noted that when the sealing ring is secured in position on the plug 52, a space 84 is provided between the flange 78 of the nut 62 and the inner surface of the peripheral portion 72 of the sealing ring 66.

Refer now to Figures 3, 4, and 5 which show the use of a valve sealing device 50 for "gagging" a pressure relief valve of the "pop" type. The pressure relief valve shown in Figures 3, 4, and 5 illustrates the application and operation of the valve sealing device 50 and is a slightly modified form of the valve shown in Figure 1 of my U. S. Patent No. 2,278,437 issued on April 7, 1942. The valve is modified for welding directly to a container for fluid under pressure which is presently a preferred method of attachment. When the valve is welded to the container or boiler it is not easily removed to allow the opening in the container to be plugged for hydrostatic testing, making this invention even more useful in such case. Another modification of said valve is a slight change in the shape of the conical portion 14 of the valve disk 8. This valve is used merely for the purpose of illustration and not for the purpose of limiting the scope of the invention.

The valve sealing device 50 may be applied or installed in a valve as shown in Figure 3 by the following procedure.

(1) Remove cap set screws 41, 42, cotter pin 90 and pivot pin 45 shown by dashed lines in Figure 3.

(2) The lever 44 may now be drawn out and the cap or bonnet 40 can be removed.

(3) Extract the cotter pin 92 from the valve stem nut 46 and turn down nut 46 on the stem or spindle 11 to within one-eighth turn of the face of adjusting screw 29. The valve stem nut 46 may be locked in this position by means of a standard nut 94 tightened against its upper surface.

(4) The two frame rod nuts 96 may now be loosened and should turn free after approximately one-half turn as the spring load will be transferred to the upper end of stem 11 when the top face of the adjusting screw 29 engages the lower surface of the valve stem nut 46.

(5) After the frame rod nuts 96 are removed the entire top valve assembly may be lifted straight up thereby disassemblying it from the remaining portion of the valve. By this operation the valve disk 8 is removed as part of the top assembly with the piston 9.

(6) Remove cap screw 21 and disengage the guide 19 from the valve by lifting upwardly.

(7) The nozzle adjusting ring 7 may be marked for the purpose of realignment, before the locking screw 7a is backed up so that the nozzle adjusting ring 7 is turned clockwise to bring its upper edge below the surface of the seat face of the throat tube 4. The locking screw 7a may now be turned in to retain the adjusting ring 7 in this position.

(8) The valve sealing device 50 may now have its central and lower portions 58, 60 placed in the relief opening of the throat tube 4 with the peripheral portion 72 of the sealing ring 66 facing downwardly. The inner wall 100 bounding the relief opening 98 may be lubricated with a light oil before the plug is placed therein (see Figure 4).

(9) The guide 19 may now be replaced and secured by cap screw 21.

(10) The top assembly may now be lowered into position and nuts 96 may now be replaced to secure the crossbar or yoke 28 with the frame rods 30, 31. The spindle or stem 11 now assumes a raised position because of the installation of the valve sealing device 50 resulting in an increased space between the top of the adjusting screw 29 and the bottom of the valve stem nut 46 which is to be expected.

The valve has now been effectively gagged.

The reverse process is carried out to remove the valve sealing device 50 from the relief valve.

Referring now for greater detail to the enlarged view of Figure 4, it is noted that the head portion 54 of the plug 2 is interposed between the lower surface of the annular sealing ridge 102 of the valve disk 8 and the upper surface of the valve seat 104 at the top of the throat tube 4. The central depression 56 accommodates the lower conical portion 14 of the valve disk 8, while the annular groove 106 is provided in the central portion 58 of the plug 50 to better accommodate its insertion in the particular throat tube.

The outer face of the peripheral portion 72 of the sealing ring 66, contacts the inner wall 100 bounding a relief opening 98, while the inner face of portion 72 forms an opening with the flange 78 of the nut 62 which communicates with the relief opening 98 below the valve sealing device 50.

It is noted that the sealing ring 72 cooperating with the plug 50 engages the inner wall 100 to effectively seal the top of the relief opening 98. The fluid pressure within the relief opening 98 below the plug 50 is exerted through the opening 84 upon the inner face of the peripheral portion 72 of the sealing ring 66 augmenting the contact pressure of the outer face of the peripheral portion 72 on the inner wall 100 of the throat tube 4. Thus sealing efficiency is maintained under conditions of higher fluid pressure by thus augmenting the contact or sealing pressure of the sealing ring 66 responsive to increased fluid pressure.

Because the ring 66 operates to effectively seal the top of the relief opening 98, fluid under the plug 50 is not allowed to come in contact with the sealing surfaces of the throat tube 4 and valve disk 8. Damage to these surfaces due to impurities present in the fluid under test conditions and which otherwise could come in contact with the seating surfaces is thus averted.

It is also noted that the seating of the valve disk 8 upon the seat 104 is not utilized for the purpose of sealing or gagging the valve, but that sealing is accomplished by the alternate means just described. Furthermore the spindle or stem 11 is not locked in position nor is an abnormal compressive force applied thereto in order to effect sealing or gagging, eliminating such sources of damage to the valve.

The head portion 54 of the sealing device 50 functions mainly to axially position the coaxial portions of the plug lying within the opening 98 of the throat tube 4. The spring loaded valve disk 8 which contacts the upper surface of the head portion 54 of the plug 50, urges the plug 50 towards its lowermost position which is assumed when the lower surface of the head portion 54 contacts the valve seat 104.

Figure 5 shows the plug with the lower surface of its head portion 54 raised above the seat 104 under conditions of sufficiently increased fluid pressure within the relief opening 98 under the plug 50. It is noted that as the valve disk 8 is raised it compresses the spring 108 increasing the force exerted on the plug 50. The valve plug 50 therefore assumes an equilibrium position which corresponds with the fluid pressure exerted thereon.

It is noted that the axial motion of the plug 50 under increased fluid pressure does not interfere with the effective sealing action of the sealing ring 66. The ring 66 maintains its efficiency by the hydrostatic action of the fluid pressure exerted thereon as previously explained.

Referring back to Figure 3, it is noted that the valve 8 assumes its maximum lift when the top portion of the sleeve 32 contacts the undersurface of the collar 34 effecting maximum compression of the spring 108. The height of the cylindrical section of the head portion 54 of the plug 50 has in this instance been made less than the maximum lift of the valve disk 8 from its seat 104 so that after the plug 50 is installed a space 110 remains between the top portion of the sleeve 32 and the collar 34.

This allows the plug 50 to move upwardly and downwardly under conditions of changing pressures described, within the given limits. The upper limit of motion for the plug 50 is assumed when the sleeve butts up against the collar 34. This manner of limiting the further upward motion of the plug 50 and the valve disk 8 so distributes the forces applied that damage to the valve is minimized.

For example when the plug 50 is in its upper limit any additional loading applied to the valve is carried by the thickened portion of the stem or spindle 11. Thus the upper portion of stem 11 which is of reduced diameter is not subjected to overloading.

The upper limit of motion of the plug 50 and valve disk 8 also prevents damage to the spring 108 by overloading it.

It will be obvious to those skilled in the art that the invention may find wide application with appropriate modification to meet the various design circumstances, but without substantial departure from the essence of the invention.

What is claimed is:

1. In a sealing device for a pressure relief valve of the type having a throat tube provided with a valve seat at one end thereof and a relief opening therethrough bounded by a substantially cylindrical internal surface, and a normally seated pressure loaded valve disk for restricting said relief opening having a predetermined maximum lift; a plug comprising a substantially cylindrical head portion received between the valve disk and valve seat, an intermediate coaxial substantially cylindrical portion extending into the cylindrical relief opening of said valve, a coaxial threaded lower stem portion, and a nut threadedly engaging the stem portion; the thickness of the head portion of the plug exceeding the maximum lift of said valve disk; and a resilient sealing ring having a central portion secured between the intermediate portion and the nut of said plug, and a peripheral portion substantially perpendicular to its central portion and having an outer face movably engaging the internal surface bounding the relief opening of said valve and an inner surface exposed to fluid within said relief opening under said plug; the pressure of said fluid acting to augment the contact pressure of said sealing ring upon the internal surface bounding the relief opening of said valve.

2. In a valve having a throat tube, a seat thereon and a movable member cooperating therewith to restrict the opening of said throat tube; a valve sealing plug including a head portion received between the movable member and the seat, a stem depending from said head portion and extending into said throat tube and a flexible sealing ring carried by said stem and frictionally engaging the inner wall of said throat tube, the thickness of said head portion slightly exceeding the full lift of said movable member so that the sealing ring can at no time rise above the opening of the throat tube.

References Cited in the file of this patent

UNITED STATES PATENTS

| 1,062,144 | Delvaux | May 20, 1913 |
| 1,244,758 | Mowry | Oct. 30, 1917 |
| 1,281,712 | Thompson | Oct. 15, 1918 |
| 2,278,437 | Gentzel | Apr. 7, 1942 |
| 2,525,796 | Harding | Oct. 17, 1950 |

FOREIGN PATENTS

| 76,231 | Germany | of 1894 |